United States Patent
Larsen

(10) Patent No.: US 10,157,256 B1
(45) Date of Patent: Dec. 18, 2018

(54) SYSTEMS AND METHODS FOR IDENTIFYING WIRES FOR ADJUSTMENT

(71) Applicant: Ansys, Inc., Canonsburg, PA (US)

(72) Inventor: Craig Larsen, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 14/793,918

(22) Filed: Jul. 8, 2015

Related U.S. Application Data

(60) Provisional application No. 62/022,939, filed on Jul. 10, 2014.

(51) Int. Cl.
  *G06F 17/00* (2006.01)
  *G06F 17/50* (2006.01)

(52) U.S. Cl.
  CPC ...... *G06F 17/5081* (2013.01); *G06F 17/5077* (2013.01)

(58) Field of Classification Search
  USPC .......................................................... 716/112
  See application file for complete search history.

(56) References Cited

U.S. PATENT DOCUMENTS

| | | | | |
|---|---|---|---|---|
| 2004/0194043 A1* | 9/2004 | Sundar | ................ | G06F 17/5036 716/113 |
| 2007/0278484 A1* | 12/2007 | Feustel | ................... | H01L 22/34 257/48 |
| 2011/0173583 A1* | 7/2011 | Barwin | ................ | G06F 17/5068 716/106 |
| 2012/0248604 A1* | 10/2012 | Daubenspeck | ..... | G06F 17/5068 257/738 |
| 2014/0131878 A1* | 5/2014 | Gambino | ............ | H01L 23/5226 257/773 |
| 2015/0046893 A1* | 2/2015 | Demircan | ........... | G06F 17/5081 716/118 |
| 2015/0205906 A1* | 7/2015 | Barwin, III | ......... | G06F 17/5081 716/113 |
| 2015/0348898 A1* | 12/2015 | Shroff | ................. | G06F 17/5077 257/773 |
| 2015/0356229 A1* | 12/2015 | Siu | ...................... | G06F 17/5081 716/115 |

\* cited by examiner

*Primary Examiner* — Mohammed Alam
(74) *Attorney, Agent, or Firm* — Jones Day

(57) ABSTRACT

Systems and methods are provided for identifying a wire of a plurality of wires to be adjusted to mitigate effects of electromigration. A method includes identifying a plurality of wires of a circuit, each wire comprising a one or more wire segments. An electromigration stress is determined for each wire path of each wire, a wire path being made up of one or more wire segments. For each wire, a highest determined electromigration stress is assigned for wire paths of that wire as the wire electromigration stress for that wire. An identification of the wire having the highest wire electromigration stress is stored, where the wire having the highest wire electromigration stress is a candidate for adjustment to mitigate electromigration effects.

20 Claims, 9 Drawing Sheets

WIRE_TABLE

| WIRE_ID | WIRE_ELECTROMIGRATION_STRESS | WIRE_ELECTROMIGRATION_RANK |
|---|---|---|
| 1 | 5.23 | 1 |
| 2 | 0.64 | 2 |
| 3 | 2.02 | 3 |

WIRE_PATH_TABLE

| WIRE_PATH_ID | WIRE_PATH_WIRE | WIRE_PATH_ELECTROMIGRATION_STRESS |
|---|---|---|
| 1 | 1 | 5.23 |
| 2 | 1 | 2.16 |
| 3 | 1 | 0.61 |
| 4 | 1 | 1.07 |
| 5 | 2 | 0.64 |
| 6 | 3 | 2.02 |

WIRE_SEGMENT_TABLE

| WIRE_SEGMENT_ID | WIRE_SEGMENT_PATH | WIRE_SEGMENT_ELECTROMIGRATION_STRESS |
|---|---|---|
| 1 | 1 | 0.77 |
| 2 | 2 | 0.87 |
| 3 | 1 | 0.86 |
| 4 | 1 | 0.18 |
| 5 | 1,3 | 0.61 |
| 6 | 1 | 0.38 |
| 7 | 1,2 | 0.95 |
| 8 | 1 | 0.94 |
| 9 | 4 | 0.63 |
| 10 | 4 | 0.44 |
| 11 | 2 | 0.34 |
| 12 | 1 | 0.54 |
| 13 | 5 | 0.39 |
| 14 | 5 | 0.25 |
| 15 | 6 | 0.42 |
| 16 | 6 | 0.92 |
| 17 | 6 | 0.68 |

*Fig. 8*

WIRE_TABLE

| WIRE_ID | WIRE CURRENT_ DENSITY | WIRE_ VIOLATION | WIRE_ ELECTRO- MIGRATION_ STRESS | WIRE_ ELECTRO- MIGRATION_ RANK |
|---|---|---|---|---|
| 1 | 1.15 | 1 | 5.23 | 1 |
| 2 | 2.22 | 1 | 0.64 | 3 |
| 3 | 1.75 | 1 | 2.02 | 2 |
| 4 | 0.66 | 0 | | |

WIRE_PATH_TABLE

| WIRE_PATH_ID | WIRE_PATH_WIRE | WIRE_PATH_ ELECTRO- MIGRATION_ STRESS |
|---|---|---|
| 1 | 1 | 5.23 |
| 2 | 1 | 2.16 |
| 3 | 1 | 0.61 |
| 4 | 1 | 1.07 |
| 5 | 2 | 0.64 |
| 6 | 3 | 2.02 |

WIRE_SEGMENT_TABLE

| WIRE_SEGMENT_ID | WIRE_SEGMENT_PATH | WIRE_SEGMENT_ ELECTRO- MIGRATION_ STRESS |
|---|---|---|
| 1 | 1 | 0.77 |
| 2 | 2 | 0.87 |
| 3 | 1 | 0.86 |
| 4 | 1 | 0.18 |
| 5 | 1,3 | 0.61 |
| 6 | 1 | 0.38 |
| 7 | 1,2 | 0.95 |
| 8 | 1 | 0.94 |
| 9 | 4 | 0.63 |
| 10 | 4 | 0.44 |
| 11 | 2 | 0.34 |
| 12 | 1 | 0.54 |
| 13 | 5 | 0.39 |
| 14 | 5 | 0.25 |
| 15 | 6 | 0.42 |
| 16 | 6 | 0.92 |
| 17 | 6 | 0.68 |

*Fig. 9*

SYSTEMS AND METHODS FOR IDENTIFYING WIRES FOR ADJUSTMENT

CROSS-REFERENCE TO RELATED APPLICATIONS

This application claims priority to U.S. Provisional Patent Application No. 62/022,939, filed Jul. 10, 2014, and entitled "Systems and Methods for Identifying Wires for Adjustment," the entirety of which is herein incorporated by reference.

FIELD

This disclosure is related generally to circuit design and more particularly to improvement of circuit reliability.

BACKGROUND

Electronic circuits, such as those housed in integrated circuit packages or disposed on printed circuit boards, can be highly complex, often including thousands or millions of component interconnections. Failure of one of these interconnections could result in a malfunction of a portion or all of a circuit.

SUMMARY

Systems and methods are provided for identifying a wire of a plurality of wires to be adjusted to mitigate effects of electromigration. A method includes identifying a plurality of wires of a circuit, each wire comprising one or more wire segments. An electromigration stress is determined for each wire path of each wire, a wire path being made up of one or more wire segments. For each wire, a highest determined electromigration stress for wire paths of that wire is assigned as the wire electromigration stress for that wire. An identification of the wire having the highest wire electromigration stress is stored, where the wire having the highest wire electromigration stress is a candidate for adjustment to mitigate electromigration effects.

As another example, a system for identifying a wire of a plurality of wires to be adjusted to mitigate effects of electromigration includes one or more data processors and one or more computer-readable mediums encoded with data. The data includes a wire data structure, where the wire data structure includes an identification of a plurality of wires in a circuit, where the wire data structure further includes and identification of one or more wire paths associated with each of the identified wires of the circuit, a wire path including one or more wire segments, where the wire data structure includes a wire electromigration stress field for each of the plurality of wires, where the wire data structure includes a wire path electromigration stress field for each wire path, and where the wire data structure includes a wire rank field for each wire. The data further includes instructions for commanding the one or more data processors to execute steps. The steps include identifying the plurality of wires in the circuit and storing identifications of the identified wires in the wire data structure, determining an electromigration stress for each wire path of each wire and storing the determined electromigration stresses in the wire path electromigration stress fields of the wire data structure, for each wire, assigning a highest determined electromigration stress for wire paths of that wire from the wire data structure as the wire electromigration stress for that wire and storing the wire electromigration stresses in the wire electromigration stress fields of the wire data structure, and storing an identification of the wire having the highest wire electromigration stress from the wire data structure in the wire rank field associated with the wire having the highest wire electromigration stress, where the wire having the highest wire electromigration stress is a candidate for adjustment to mitigate electromigration effects.

BRIEF DESCRIPTION OF THE DRAWINGS

FIG. 8 depicts example contents of a wire data structure.

FIG. 9 depicts example contents of a second wire data structure.

DETAILED DESCRIPTION

Figure 1:
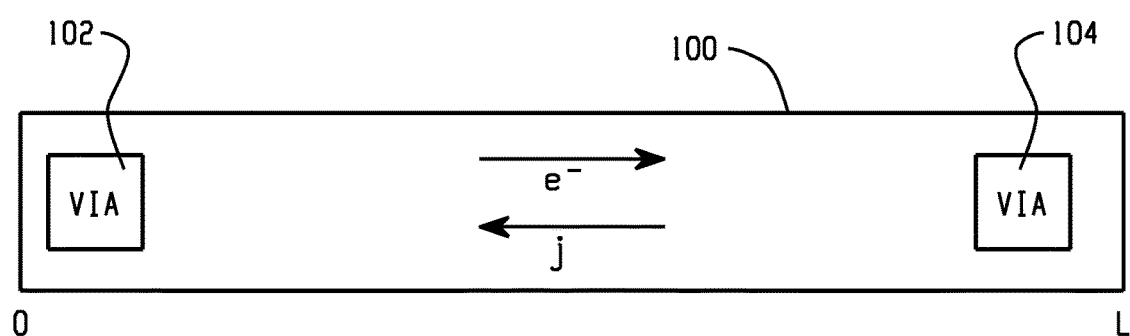
FIG. 1 is a diagram depicting an electromigration stress in an example wire segment of a wire.

FIG. 1 is a diagram depicting an electromigration stress in an example wire segment of a wire. The wire segment 100 includes a first via 102 and a second via 104. Electrons (e) enter the wire segment 100 through the first via 102 and exits the wire segment 100 through the second via 104. As electrons moves from left to right in the wire segment 100, they occasionally contact metal atoms (e.g., copper) within the wire segment imparting momentum to the metal atoms. This momentum transfer, over time, acts as a force that moves the copper atoms in the direction of the electron flow (i.e., left to right in FIG. 1). This movement of atoms is referred to as electromigration. The electromigration force in the direction of current flow, given sufficient time, creates an equal and opposite stress ($\sigma$) on the wire segment 100 in the opposite direction, such that the electron force minus the stress equals zero.

Figure 2A:
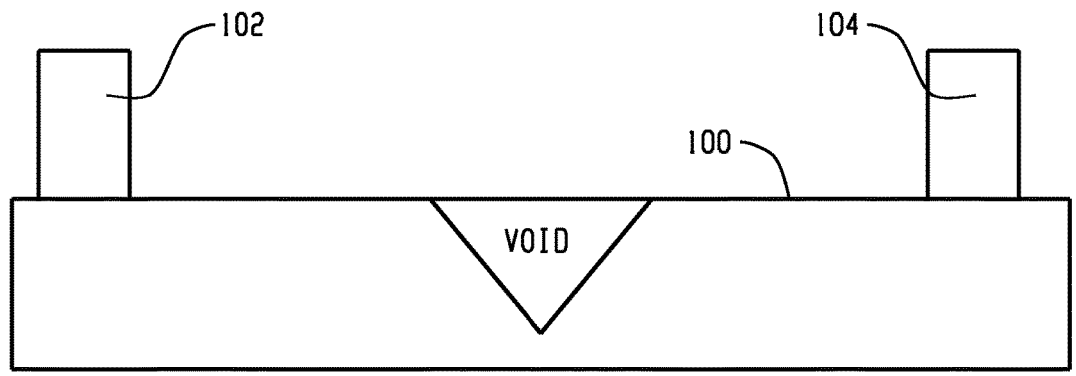
FIG. 2A depicts an electromigration void that increases a resistance of the wire segment.
Figure 2B:
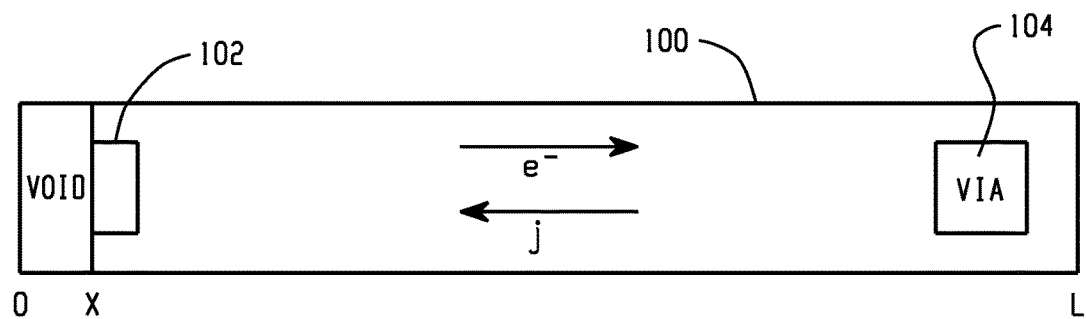
FIG. 2B depicts an electromigration void that threatens a connection between a first via and the wire segment.

The electromigration force in a wire segment 100 can have detrimental effects on the performance of that wire segment 100 over time. As metal atoms are moved in the direction of electron flow, voids can form in the wire segment. Such voids can cause an increase in resistance of the wire segment 100 based on a reduced cross-sectional area of the wire segment 100 at the point of the void, as depicted in FIG. 2A. Experiments have shown that such void development often occurs near the electron source in the wire segment 100, such as near first via 102, as depicted in FIG. 2B. Development of such voids, in some cases, results in an open circuit at the junction of the first via 102 and the wire segment 100. In other cases, electromigration damage causes short circuits, excess generation of heat, or other failure modes of the electric circuit. When wires within a circuit are identified as being potentially susceptible to electromigration damage, the design of those wires can be adjusted to help mitigate potential damage. For example, a width of a wire segment can be increased or a length of a wire segment can be shortened to reduce the chance of the wire in which that segment resides experiencing damage.

Figure 3:
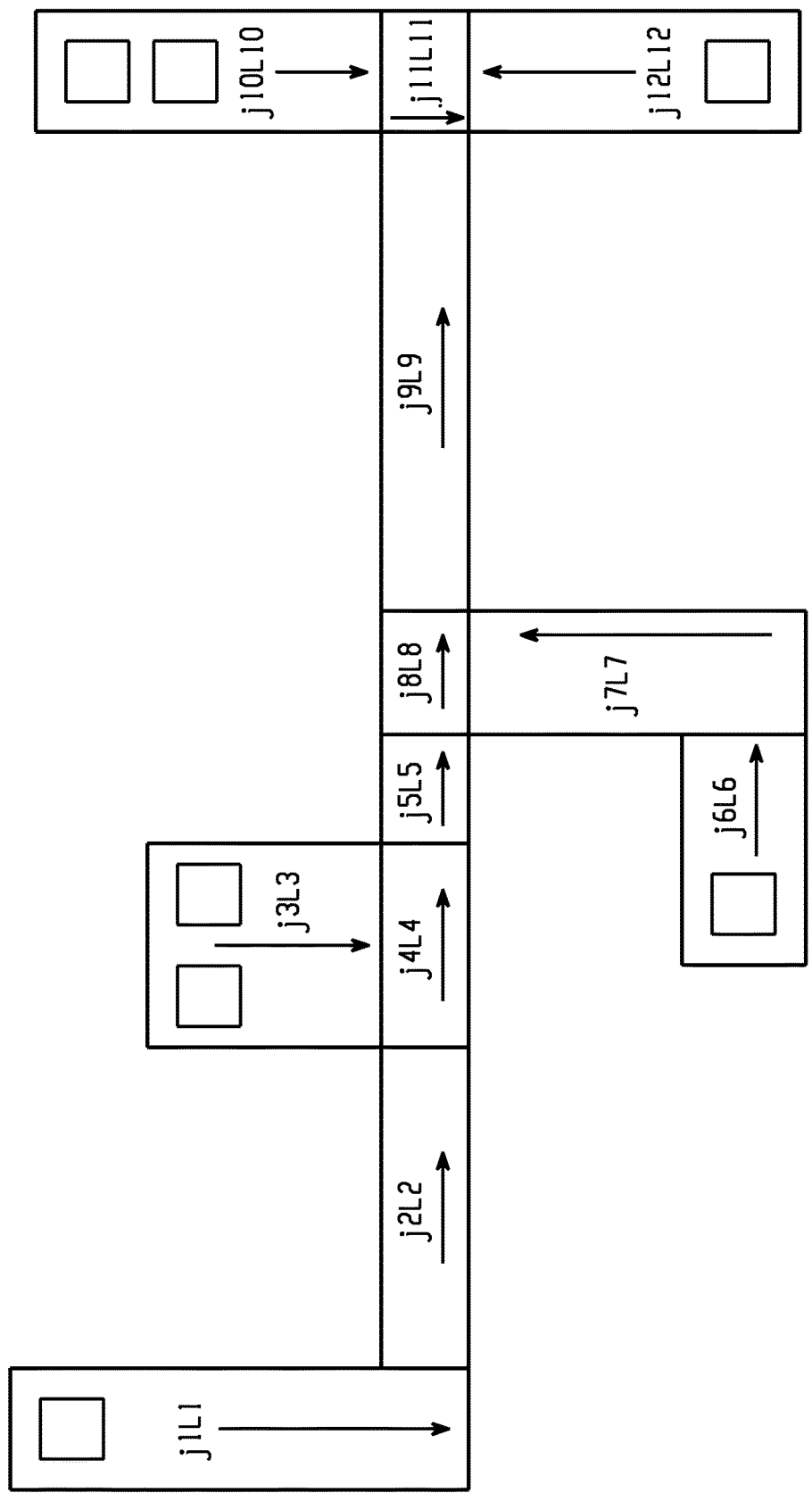
FIG. 3 depicts an example complex wire of a circuit that includes several wire segments with multiple current inputs and outputs.

Current density through a wire segment can be used as a rough estimate of a wire segment's susceptibility to electromigration damage. For example, circuit operation can be simulated, and an average or worst-case current density can be assessed to determine a likelihood that a wire segment in a design will experience electromigration damage before the end of its useful life. Experimentation has shown that wires experiencing high current density often exhibit electromigration damage sooner than wires that do not undergo such high current densities. In fact, high current densities have shown to be good predictors of electromigration damage in cases of simple wires (e.g., a straight connection between two points). However, such correlation has not held in cases of complex wires, such as the wire of FIG. 3. FIG. 3 depicts an example complex wire of a circuit that includes several wire segments with multiple current inputs and outputs. Wires at least as complex as shown in FIG. 3 are commonplace in electric circuits. In FIG. 3, each of segments, 1, 3, 6, 10, and 12 has at least one input or output via. Susceptibility to electromigration damage is not well predicted by current density in complex wires, such as the wire shown in FIG. 3. At best, current density is a rough predictor of susceptibility, and not an accurate predictor of actual damage. However, current density is fairly easy to estimate, making it an attractive candidate for analysis.

Figure 4:
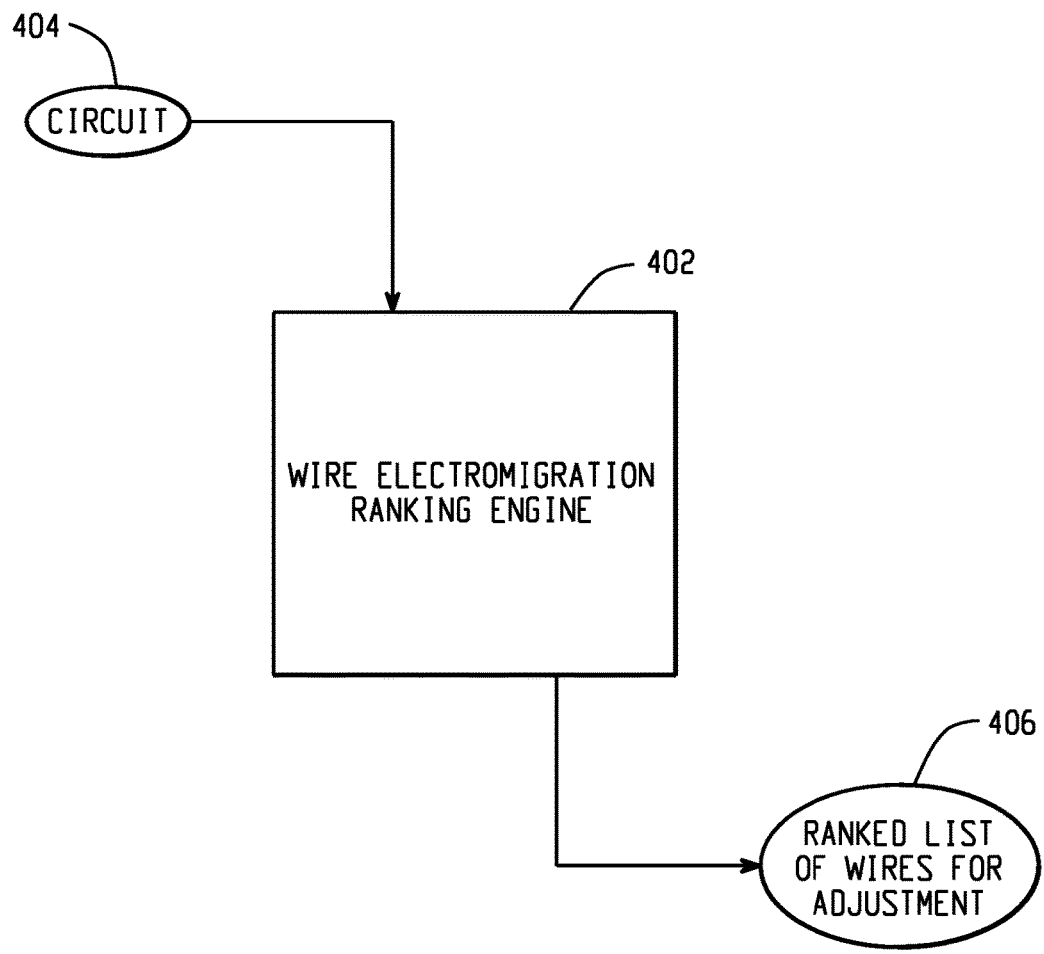
FIG. 4 is a block diagram depicting a computer-implemented system for identifying a set of wires to be adjusted to mitigate effects of electromigration.

FIG. 4 is a block diagram depicting a computer-implemented system for identifying a set of wires to be adjusted to mitigate effects of electromigration. An electric circuit could include many thousands if not millions of wires. It is not feasible to design certain circuits such that no wire will be susceptible to electromigration damage. One strategy for addressing potential electromigration damage is to harden those wires deemed most susceptible to such damage (e.g., by widening or shortening wire segments within those wires). Because an electric circuit, such as a circuit housed in an integrated circuit package, could have many thousands if not millions of wires, it is beneficial to identify a ranked list of candidate wires for adjustment, where that list begins with a wire most susceptible to electromigration damage.

The system of FIG. 4 includes a wire electromigration susceptibility engine 402. The engine 402 receives a circuit design 404. The engine 402 examines certain characteristics of the circuit 404, such as via simulation, where the engine 402 identifies likely currents and electromagnetic fields within the circuit 404 and extracts certain circuit performance metrics. The engine 402 uses those metrics to identify which wires within the circuit 402 are most susceptible to electromigration damage. The engine 402 generates a ranked list 406 of wires that are candidates for adjustment. The list 406 includes wires within the circuit 404 that are most likely to experience electromigration damage, such that a user (e.g., an engineer) could use the list 406 to identify where in the circuit 404 to focus mitigation efforts.

Figure 5:
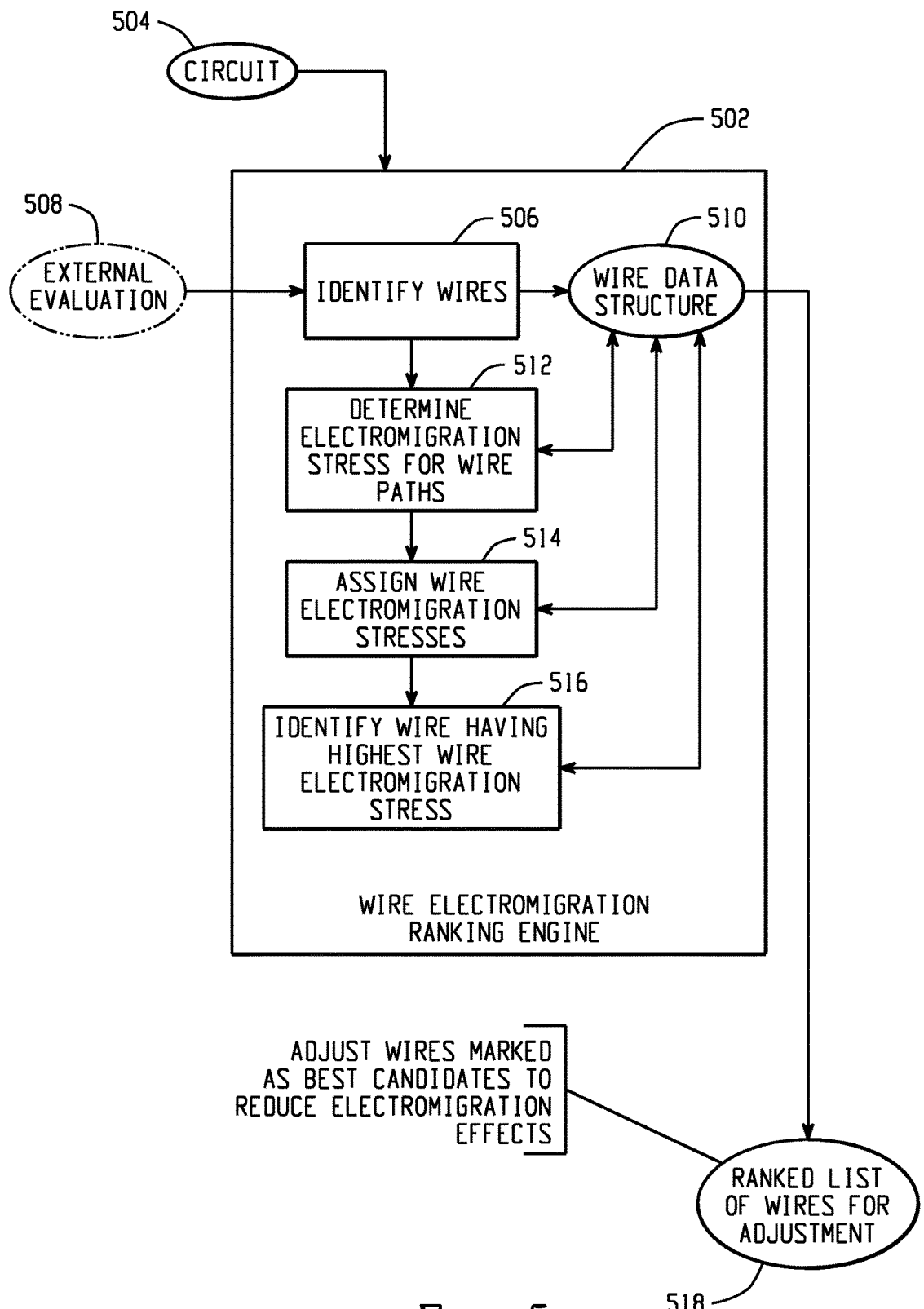
FIG. 5 is a block diagram depicting example operations performed by a wire electromigration susceptibility ranking engine in one embodiment.

FIG. 5 is a block diagram depicting example operations performed by a wire electromigration susceptibility ranking engine in one embodiment. The engine 502 receives details of an electric circuit 504 to be evaluated. At 506, the engine 502 determines which of the wires of the circuit 504 are to be evaluated for susceptibility to electromigration damage. In one example, all wires of the circuit 504 are analyzed. In another example, the engine 502 performs a rough filtering of all of the wires of the circuit 504 at 506 based on a criterion such as current density through those wires. Wires found to have a current density greater than a threshold (e.g., based on a simulation of operation of the circuit 504) are identified as candidates for further examination. In another example, an initial filtering of the wires of the circuit 504 is performed externally, as indicated at 508, such as where an external entity performs an initial filtering of wires based on simulated current density.

In one embodiment, data associated with wires identified for evaluation is incorporated into a wire data structure 510. A wire data structure 510 includes information including an identification of particular wires of the circuit 504, metrics about the performance of those wires (e.g., via simulation), and a ranking of those wires based on susceptibility to electromigration damage. The wire data structure 510 also identifies individual paths and segments of each identified wire, where certain analyses can be performed on individual wire paths and segments within a wire to determine a likelihood that that a wire experiences electromigration damage at some point along its length. A wire path within a wire (e.g., a complex wire as depicted in FIG. 3) includes one or more segments of the wire.

At 512, an electromigration stress metric value is determined for each of the wire segments of each of the wires identified as candidates for analysis at 506, and those wire segment electromigration stresses are used to determine wire path electromigration stress metric values. A wire path electromigration stress metric value is equal to a sum of electromigration stress metric values of its component wire segments, in one example. As noted above, current density is often not a strong predictor of electromigration damage susceptibility, especially in wires having complex geometry. Thus, at 512, for each of the wires identified at 506 for further analysis, each segment of those wires is analyzed to determine an electromigration stress metric value. Electromigration stress has been found to be a better and more physics-proper mechanism for predicting electromigration damage. In some examples, electromigration stress is a more difficult metric to calculate for a wire than current density. Thus, it is sometimes prohibitively computationally expensive to determine an electromigration stress for all wire segments of a circuit 504, especially in circuits having thousands or millions of wires. Thus, the initial filtering at 506 narrows the wires for which the more computationally expensive electromigration stress determinations are made at 512.

Such segment electromigration stress metric values for wire segments and wire paths are stored in the wire data structure 510. At 514, each wire identified at 506 is assigned an electromigration stress metric value for that entire wire based on electromigration stress metric values for the individual wire paths of that wire. In one example, each wire is assigned an electromigration stress metric value equal to the highest electromigration stress metric value assigned to one of its paths (e.g., based on each wire being only as robust as its weakest path). The wire electromigration stress metric values determined at 514 are incorporated into the wire data structure 510. At 516, the engine 502 identifies a wire having a highest electromigration stress and stores an indication of such in the wire data structure 510. The engine, in one example, further identifies a wire having a second electromigration stress, a third highest electromigration stress, and so on, to generate a ranked list of wires 518 that is ordered based on susceptibility to electromigration damage.

A user (e.g., an engineer) can then focus his efforts according to the ranked list, focusing on improving characteristics of wires most likely to experience electromigration damage. In one example, reducing an amount of electromigration stress within a wire below a critical threshold point will result in that wire exhibiting zero or near zero electromigration damage. Thus, the user can use the ranked list to prioritize which wires to adjust in the circuit design, with the goal of reducing the electromigration stress of all wires to below or as close to the critical threshold point as possible.

Figure 6:
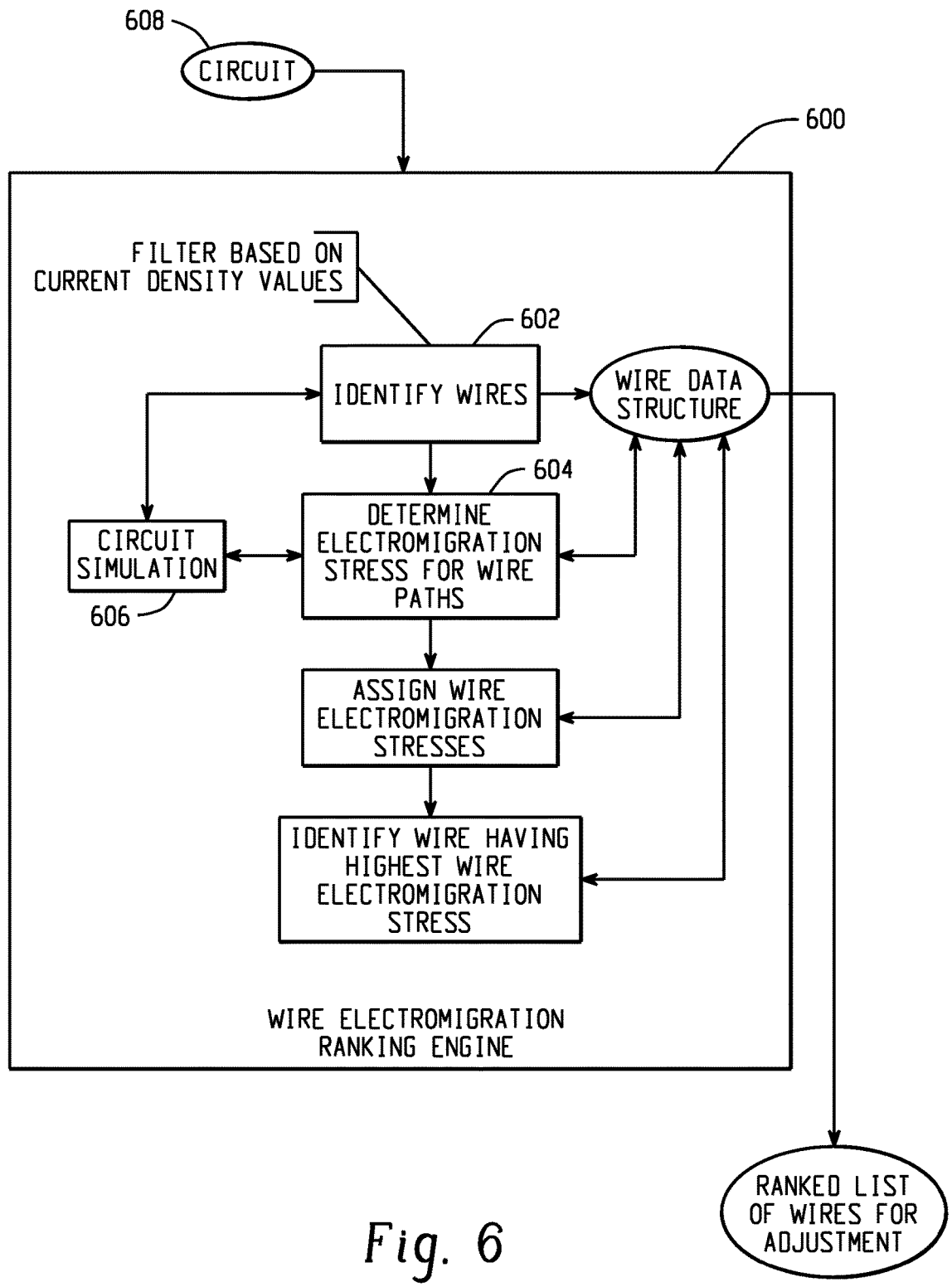
FIG. 6 is another block diagram depicting example operations performed by a wire electromigration susceptibility ranking engine in one embodiment.

FIG. 6 is another block diagram depicting example operations performed by a wire electromigration susceptibility ranking engine in one embodiment. The system 600 of FIG. 6 functions similarly to that of FIG. 5, with the identification of candidate wires for analysis at 602 and the determination of electromigration stresses for wire paths of candidate wires at 604 is expressly performed using simulation, as depicted at 606. For example, current densities of wires of the circuit 608 are simulated at 606 for use in identifying candidate wires, and other metrics for determining an electromigration stress metric value for each wire path of an identified wire at 604 are also determined via simulation 606.

An electromigration stress metric value for a segment of a wire can be calculated in a variety of ways. In one example, the electromigration stress of a segment of a wire is modeled as linear, with the magnitude of the stress difference between the ends of the wire segment being given by the equation:

$$\Delta \sigma = \frac{Z^* e \rho}{\Omega} jL,$$

where $Z^*$ is the effective valance, e is the charge of an electron, p is the material resistivity, $\Omega$ is the atomic volume of an atom of the material in the wire, j is the current density, and L is the length of the wire segment. The product jL is sometimes referred to as the Blech product for wires consisting of a single segment. An electromigration stress metric value for a wire path is then calculated as the sum of electromigration stress metric values of segments within that wire path.

Figure 7:
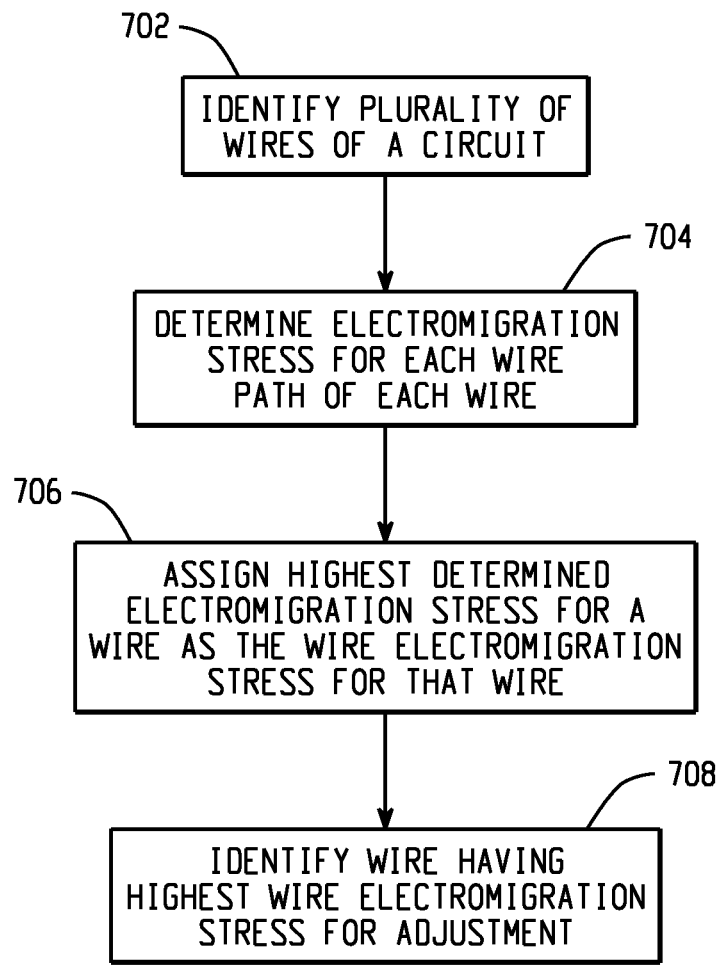
FIG. 7 is a flow diagram depicting a computer-implemented method for identifying a wire of a plurality of wires to be adjusted to mitigate effects of electromigration.

FIG. 7 is a flow diagram depicting a computer-implemented method for identifying a wire of a plurality of wires to be adjusted to mitigate effects of electromigration. A method includes identifying a plurality of wires of a circuit to be analyzed at 702, each wire comprising a one or more wire segments. At 704, an electromigration stress metric (e.g., a jL value) is determined for each wire path of each identified wire based on electromigration stresses associated with each of the wire segments within that wire path. For each wire, a highest determined electromigration stress for wire paths of that wire is assigned at 708 as the wire electromigration stress for that wire. An identification of the wire having the highest wire electromigration stress is stored at 710, where the wire having the highest wire electromigration stress is a candidate for adjustment to mitigate electromigration effects. Additional wires having next highest wire electromigration stresses are added to a list containing the wire identified at 708 to generate a ranked list of wires for mitigation.

FIG. 8 depicts example contents of a wire data structure. The example includes a wire table. The wire table includes a wire ID column that identifies an index for each wire. The wire table further includes a Wire_Electromigration_Stress column. In one example, as described above, each wire is assigned a Wire_Electromigration_Stress value equal to a highest electromigration stress metric value determined for any of its paths. The wire table further includes a Wire_Electromigration_Rank column that contains a value that indicates a wires susceptibility to electromigration stress damage compared to other wires stored in the table.

FIG. 8 further depicts a wire path table. The wire path table depicts data associated with individual wire paths of wires identified in the wire table. The wire path table includes a Wire_Path_ID column that contains an index for each wire path. The wire path table further includes a Wire_Path_Wire field that indicates to which entire wire a wire path is associated. In the example of FIG. 8, wire paths 1-4 are associated with wire 1, wire path 5 is associated with wire 2, and wire path 6 is associated with wire 3. A third column of the wire path table, Wire_Path_Electromigration_Stess, contains an electromigration stress metric value determined for each wire path, which in the example of FIG. 8 is the sum of electromigration stress metric values determined for each segment of that wire path.

FIG. 8 further depicts a segment table. The wire segment table depicts data associated with individual segments of wire paths identified in the wire path table. The wire segment table includes a Wire_Segment_ID column that contains an index for each wire segment. The wire segment table further includes a Wire_Segment_Path field that indicates to which wire path a wire segment is associated. In the example of FIG. 8, wire segment 5 is associated with wire paths 1 and 3 (which are associated with wire 1), wire segment 9 is associated with wire path 4 (which is also associated with wire 1), while wire segment 16 is associated with wire path 6 (which is associated with wire 3). A third column of the wire segment table, Wire_Segment_Electromigration_Stress, contains an electromigration stress metric value (e.g., a jL value) determined for each wire segment.

As described above, in one example, an electromigration stress metric value is determined for each wire segment (e.g., the wire segments depicted in the wire segment table) of each wire path of each wire identified for analysis (e.g., the wires identified in the wire table). Those wire segment electromigration stress metric values are stored in the third column of the wire segment table. Each wire path is then assigned a Wire_Path_Electromigration_Stress value equal to the sum of the Wire_Segment_Electromigration_Stress values associated with that wire path (e.g., the Wire_Path_Electromigration_Stress for wire path 1 is equal to the sum of stress metric values for segments 1, 3, 4, 5, 6, 7, 8, and 12; while the Wire_Path_Electromigration_Stress for wire path 2 is equal to the sum of stress metric values for segments 2, 7, and 11).

In the wire table, the Wire_Electromigration_Stress field for a wire is populated with the highest electromigration stress metric value assigned to any of its paths. In the example of FIG. 8, wire 1 is associated with wire paths 1-4. Of those wire paths, wire path 1 has the highest determined path electromigration stress metric value of 5.23. Thus, wire 1 is assigned a Wire_Electromigration_Stress value of 5.23. Wire 2 is associated with wire path 5. That path has a determined path electromigration stress metric value of 0.64. Thus, wire 2 is assigned a Wire_Electromigration_Stress value of 0.64. Wire 3 is associated with path 6. Wire path 6 has a determined path electromigration stress metric value of 2.02. Thus, wire 3 is assigned a Wire_Electromigration_Stress value of 2.02.

The wires identified in the wire table are then ranked according to their Wire_Electromigration_Stress values, as indicated in the Wire_Electromigration_Rank column. Wire 1, having the highest Wire_Electromigration_Stress value of 5.23 is ranked first, with wire 3 being ranked second based on its 2.02 Wire_Electromigration_Stress value, and wire 2 being ranked third based on its 0.64 Wire_Electromigration_Stress value. This ranked list of wires for adjustment can then be used for downstream adjustment of wires of the circuit. For example, a user (e.g., an engineer) may begin improving the circuit design by adjusting parameters of wire 1, based on that wire being deemed most susceptible to electromigration damage. Wire 3 is then the second best candidate for adjustment, followed by wire 2.

FIG. 9 depicts example contents of a second wire data structure. The wire data structures of FIG. 9 in large part function similarly to those of FIG. 8. One difference is the inclusion of a Wire Current Density field and a Wire Violation field in the wire table. As noted above, a current density of a wire (e.g., as determined by simulation) can be used as a rough filter criteria for narrowing the set of wires for which electromigration stresses are determined. In the example of FIG. 1, wire current densities are determined for each of the four wires listed in the table. Wires that exceed a current density threshold (e.g., 1.00) are considered to be in violation and are candidates for electromigration stress analysis. As shown in FIG. 9, wires 1, 2, and 3 have current densities greater than the 1.00 threshold. Thus, those wires are marked as being in violation, and paths and segments associated with those wires are analyzed, with wire segment electromigration stress metric values being determined for the segments of wires 1 through 3.

As described above, electromigration stress metric values for wire segments can be determined using a variety of mechanisms. In addition to the examples described above, where an electromigration stress metric value for a wire is determined based on a maximum segment electromigration stress metric value for segments of that wire, an electromigration stress metric value for a wire can be calculated according to a simplified formula. In one example, the electromigration stress calculation for a wire is calculated according to $$\Delta\sigma = \frac{Z^*e}{\Omega}V$$

where V is the maximum voltage drop across all segments in the wire.

In another example, a wire path's electromigration stress metric value may be adjusted based on the stress metric value for that path being below the critical stress threshold. In one example, where the calculated stress of a wire path is below the critical stress threshold, the electromigration stress metric value for that path is stored as 0.5 times the calculated stress metric value for that path, where when the calculated stress for that wire path is above the critical stress threshold, the actual calculated electromigration stress metric value for that path is stored.

This application uses examples to illustrate the invention. The patentable scope of the invention includes other examples.

It is claimed:

1. A computer-implemented method of identifying a wire of a plurality of wires to be adjusted to mitigate effects of electromigration, comprising:
   identifying a plurality of wires of a circuit, each wire comprising one or more wire segments;
   determining an electromigration stress for each wire path of each wire, wherein a wire path comprises one or more wire segments;
   for each wire, assigning a highest determined electromigration stress for wire paths of that wire as the wire electromigration stress for that wire; and
   storing an identification of the wire having the highest wire electromigration stress, wherein the wire having the highest wire electromigration stress is a candidate for adjustment to mitigate electromigration effects;
   storing identifications of additional wires based on wire electromigration stresses associated with those additional wires;
   outputting a ranked list of identified wires, wherein the ranked list displays the identified wires sorted by the wire electromigration stresses associated with those additional wires.

2. The method of claim 1, wherein a wire path comprises one or more wire segments that constitute a possible path of an electron through the wire.

3. The method of claim 1, wherein determining the electromigration stress for each wire path comprises:
   simulating operation of the circuit; and
   determining the electromigration stress for each wire path based on the simulation.

4. The method of claim 1, wherein a wire having a highest wire electromigration stress is listed first in the ranked list.

5. The method of claim 1, further comprising:
   adjusting a characteristic of the identified wire to reduce electromigration stress within the identified wire.

6. The method of claim 5, wherein the characteristic of the identified wire is adjusted to reduce the electromigration stress to at or below a critical stress level, wherein electromigration stress damage ceases below the critical stress level.

7. A computer-implemented method of identifying a wire of a plurality of wires to be adjusted to mitigate effects of electromigration, comprising:
   identifying a plurality of wires of a circuit, each wire comprising one or more wire segments;
   determining an electromigration stress for each wire path of each wire, wherein a wire path comprises one or more wire segments;
   for each wire, assigning a highest determined electromigration stress for wire paths of that wire as the wire electromigration stress for that wire; and
   storing an identification of the wire having the highest wire electromigration stress, wherein the wire having the highest wire electromigration stress is a candidate for adjustment to mitigate electromigration effects;
   wherein the electromigration stress for a particular wire path is determined by calculating a Blech product value for the particular wire path.

8. A computer-implemented method of identifying a wire of a plurality of wires to be adjusted to mitigate effects of electromigration, comprising:
   identifying a plurality of wires of a circuit, each wire comprising one or more wire segments;
   determining an electromigration stress for each wire path of each wire, wherein a wire path comprises one or more wire segments;
   for each wire, assigning a highest determined electromigration stress for wire paths of that wire as the wire electromigration stress for that wire; and
   storing an identification of the wire having the highest wire electromigration stress, wherein the wire having the highest wire electromigration stress is a candidate for adjustment to mitigate electromigration effects;
wherein the electromigration stress for a particular wire path is determined according to:

$$\text{Electromigration Stress of path } i = \sum_{SegmentsInPath i} \frac{Z^* e \rho}{\Omega} j_i L_i;$$

wherein $\Omega$ is an atomic volume of an atom of a material of the particular wire path, wherein $Z^*$ is an effective valence, wherein e is a charge of an electron, wherein $\rho$ a resistivity of the material of the particular wire path and wherein $\Delta\sigma$ is a change in stress.

9. The method of claim 8, wherein $\Delta\sigma$ is determined according to:

$$\Delta\sigma = \frac{Z^* e}{\Omega} V;$$

wherein V is based on a simulated voltage drop across the particular wire path.

10. The method of claim 1, wherein the plurality of wires are identified based on a filtering of all wires of the circuit.

11. A computer-implemented method of identifying a wire of a plurality of wires to be adjusted to mitigate effects of electromigration, comprising:
identifying a plurality of wires of a circuit, each wire comprising one or more wire segments;
determining an electromigration stress for each wire path of each wire, wherein a wire path comprises one or more wire segments;
for each wire, assigning a highest determined electromigration stress for wire paths of that wire as the wire electromigration stress for that wire; and
storing an identification of the wire having the highest wire electromigration stress, wherein the wire having the highest wire electromigration stress is a candidate for adjustment to mitigate electromigration effects;
wherein the plurality of wires are identified based on a filtering of all wires of the circuit, wherein filtering comprises:
determining a current density value for each of all the wires of the circuit;
identifying the plurality of wires based on the current density values.

12. The method of claim 11, wherein wires having a current density that exceeds a threshold current density are identified.

13. The method of claim 11, wherein the current density for each of the wires is determined based on a simulation of operation of the circuit.

14. The method of claim 1, wherein the circuit includes more than one million wires.

15. The method of claim 1, wherein the circuit is an integrated circuit.

16. The system of claim 1, wherein determining the electromigration stress for each wire path comprises:
simulating operation of the circuit; and
determining the electromigration stress for each wire path based on the simulation.

17. A computer-implemented method of identifying a wire of a plurality of wires to be adjusted to mitigate effects of electromigration, comprising:
identifying a plurality of wires of a circuit, each wire comprising one or more wire segments;
determining an electromigration stress for each wire path of each wire, wherein a wire path comprises one or more wire segments;
for each wire, assigning a highest determined electromigration stress for wire paths of that wire as the wire electromigration stress for that wire; and
storing an identification of the wire having the highest wire electromigration stress, wherein the wire having the highest wire electromigration stress is a candidate for adjustment to mitigate electromigration effects;
storing identifications of additional wires in the wire rank field associated with the additional wires based on wire electromigration stresses associated with those additional wires;
outputting a ranked list of identified wires based on the wire rank field, wherein the ranked list displays the identified wires sorted by the wire electromigration stresses associated with those additional wires.

18. The system of claim 17, wherein a wire having a highest wire electromigration stress is listed first in the ranked list.

19. A computer-implemented system for identifying a wire of a plurality of wires to be adjusted to mitigate effects of electromigration, comprising:
one or more data processors;
a non-transitory computer-readable medium encoded with instructions for commanding the one or more data processors to execute steps that include:
identifying a plurality of wires of a circuit, each wire comprising one or more wire segments;
determining an electromigration stress for each wire path of each wire, wherein a wire path comprises one or more wire segments;
for each wire, assigning a highest determined electromigration stress for wire paths of that wire as the wire electromigration stress for that wire; and
storing an identification of the wire having the highest wire electromigration stress, wherein the wire having the highest wire electromigration stress is a candidate for adjustment to mitigate electromigration effects;
storing identifications of additional wires based on wire electromigration stresses associated with those additional wires;
outputting a ranked list of identified wires, wherein the ranked list displays the identified wires sorted by the wire electromigration stresses associated with those additional wires.

20. A non-transitory computer-readable medium encoded with instructions for commanding one or more data processors to execute steps of a method of identifying a wire of a plurality of wires to be adjusted to mitigate effects of electromigration, the steps comprising:
identifying a plurality of wires of a circuit, each wire comprising one or more wire segments;
determining an electromigration stress for each wire path of each wire, wherein a wire path comprises one or more wire segments;
for each wire, assigning a highest determined electromigration stress for wire paths of that wire as the wire electromigration stress for that wire; and
storing an identification of the wire having the highest wire electromigration stress, wherein the wire having the highest wire electromigration stress is a candidate for adjustment to mitigate electromigration effects;

storing identifications of additional wires based on wire electromigration stresses associated with those additional wires;

outputting a ranked list of identified wires, wherein the ranked list displays the identified wires sorted by the wire electromigration stresses associated with those additional wires.

* * * * *